Mar. 27, 1923.

A. PONTZ 1,449,835

LET-BACK FOR PICK RATCHET LOOMS

Filed June 6, 1921

Inventor
Adam Pontz

By W. S. M. Stewart

Attorneys

Patented Mar. 27, 1923.

1,449,835

UNITED STATES PATENT OFFICE.

ADAM PONTZ, OF READING, PENNSYLVANIA.

LET BACK FOR PICK RATCHET LOOMS.

Application filed June 6, 1921. Serial No. 475,181.

*To all whom it may concern:*

Be it known that I, ADAM PONTZ, a citizen of the United States, residing at Reading, in the county of Berks and State of Pennsylvania, have invented certain new and useful Improvements in Let Backs for Pick Ratchet Looms, of which the following is a specification.

My invention relates particularly to that type of looms in which a ratchet-wheel is employed to measure the picks; and it consists in an improved let-back mechanism for enabling correction of the position of the wheel after failure of the filling thread and the usual somewhat delayed stoppage of the take-up, as fully set forth in connection with the accompanying drawings and clearly defined in the claims.

Figure 1:
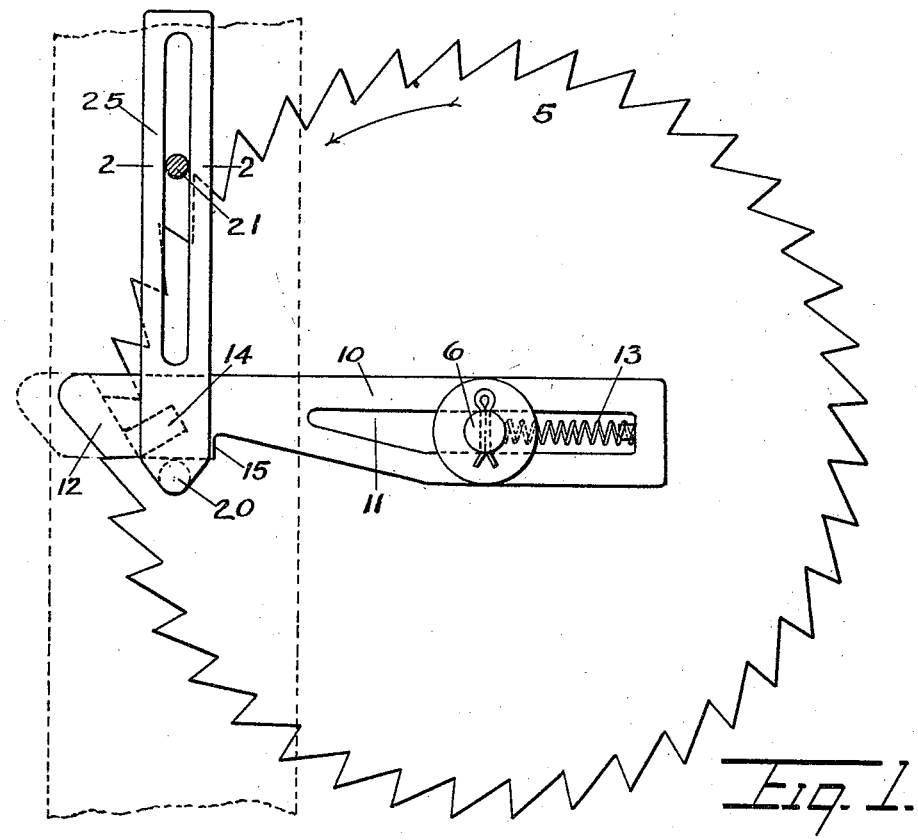
Fig. 1 is an elevation showing my improved device in operative connection with the ratchet-wheel of a pick-gear; the well known cooperating loom parts being omitted; and the near frame of the machine to which the pawl stops are secured being indicated by dotted lines merely so as to more clearly reveal the essential matter of the invention.
Figure 2:
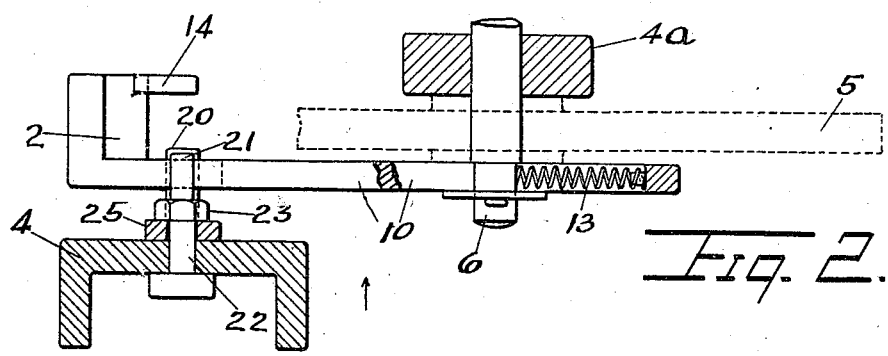
Fig. 2 is a corresponding plan view.

The usual tooth-by-tooth operation of the ratchet-wheel 5, in connection with take-off and automatic stop mechanisms, is well known, and any setting forth of a particular loom construction apart from such ratchet wheel is unnecessary as my attachment applies merely to said wheel and the adjacent machine framing.

This attachment comprises, as shown, a pawl device 12 having a shank portion 10 provided with a longitudinal slot 11 in which the extension 6 of the ratchet-wheel axle may be engaged so that the pawl device 12 may freely swing around the wheel axis; the slot permitting of its being projected radially so as to disengage its pawl portion 12 from the ratchet teeth, though such engagement is normally maintained by a retracting spring 13. A guide projection 14 on said pawl portion 12, extends inward approximately parallel with the shank portion 10, far enough to contact with the other face of the ratchet wheel even when the pawl is projected to tooth-disengaging position; in which latter position it is retained when desired by an offset 15 on the shank portion of the device, which offset is adapted to engage one of the pawl stops hereinafter referred to.

It will be understood that this tooth-engaged pawl device 12 will naturally swing with the wheel 5, excepting as such movement is prevented in the direction of feed by an adjustably fixed stop, as 20; and that the joint movement of the wheel and pawl in reverse direction, as for let-back, will be limited by a fixed stop, as 21, having a determined relation to the adjustably fixed stop 20. This fixed stop 20 merely prevents the swinging movement of the pawl on the wheel axis; the swing of the wheel 5 being continued after the pawl 12 has been disengaged from the beveled teeth by the pressing of the pawl outward against the action of spring 13; but the stop 21 will prevent further backward swinging movement of both the pawl and the wheel.

As shown in the construction illustrated a simple bolt hole is required in the adjacent machine frame 4, for passage of a bolt 22, the projecting inner end of which is adapted to serve as stop 21 above referred to; the stop 20 being merely a pawl-supporting projection on a slotted carrier 25, which latter is adjustably mounted on said fixed bolt 21—22 and locked in position by a nut 23 when it has been set so as to determinedly space-apart the stops 20 and 21.

As indicated in Fig. 1, the ratchet wheel is free to rotate tooth-by-tooth as usual, in the direction indicated by the arrow; the spring-retracted pawl sliding radially outward to permit the passing of successive teeth. As the operation of the automatic stop mechanism cannot immediately stop this movement, a determined "let-back" of the wheel and cloth, varying under different conditions, is necessary before laying the fresh filling, so as to produce a uniform texture in the fabric. This required let-back is secured by the free reverse movement of the ratchet-wheel together with the pawl device which turns on the same axis; such joint movement however being positively limited as determined by contact of the pawl device 12—10 with the properly spaced upper stop 21. As this spacing of the upper stop 21 is effected by relative adjustment of the pawl supporting stop 20 of slotted carrier 25, the normal radial position of the pawl device 12—10 being variable as desired; but obviously this stop 20 may be fixedly located and upper stop 21 be made adjustable instead with like effect, the variable spacing-apart of these stops determining the number of teeth or picks in the let-back.

What I claim is:

1. In combination with a loom having a take-up comprising a ratchet pick-gear; a let-back device comprising a radially slidable pawl pivoted upon the ratchet wheel axle and spring-retracted into engagement with the ratchet-wheel teeth, a fixed pawl-stop secured to the loom frame, and a relatively adjustable pawl-stop carried by said fixed stop.

2. In combination with a loom having a take-up comprising a ratchet pick-gear; a let-back device comprising a radially slidable pawl pivoted upon the ratchet wheel axle and spring retracted into engagement with the ratchet-wheel teeth, and adjustably spaced pawl-stops fixed to the loom frame and adapted to determinedly limit the joint let-back movement of the wheel and pawl; said spring-retracted pawl having on offset adapted to engage one of said fixed stops when the pawl is radially projected so as to disengage the ratchet-wheel teeth.

3. In combination with a loom having a take-up comprising a ratchet pick-gear; a let-back device comprising a radially slidable pawl pivoted upon the ratchet wheel axle and spring-retracted into engagement with the ratchet-wheel teeth, and adjustably spaced pawl-stops fixed to the loom frame and adapted to determinedly limit the joint let-back movement of the wheel and pawl; said spring-retracted pawl having an offset adapted to engage one of said fixed stops when the pawl is radially projected so as to disengage the ratchet-wheel teeth, and a guide-projection adjacent one face of the ratchet-wheel.

In testimony whereof I affix my signature.

ADAM PONTZ.